United States Patent

[11] 3,588,373

[72] Inventor Guido Maria Josepha Benedikt Thyssens
Wilrijk-Antwerpen, Belgium

[21] Appl. No. 698,935
[22] Filed Jan. 18, 1968
[45] Patented June 28, 1971
[73] Assignee International Standard Electric Corporation
New York, N.Y.
[32] Priority Jan. 25, 1967
[33] Belgium
[31] 693,127

[54] AC SIGNAL TRANSMISSION SYSTEM
7 Claims, 1 Drawing Fig.

[52] U.S. Cl. .......... 179/84
[51] Int. Cl. .......... H04m 1/50, H04q 9/12
[50] Field of Search .......... 179/84 (UF)

[56] References Cited
UNITED STATES PATENTS
3,358,086 12/1967 Bereznak .......... 179/84UFX
3,238,503 3/1966 Uitermark et al. .......... 179/84(UFX)

*Primary Examiner*—Kathleen H. Claffy
*Assistant Examiner*—William A. Helvestine
*Attorneys*—C. Cornell Remsen, Jr., Rayson P. Morris, Percy P. Lantzy, J. Warren Whitesel, Phillip A. Weiss and Delbert P. Warner

ABSTRACT: A multifrequency signal transmission system wherein the sending station includes $n$ frequency generators each having a different frequency. Each of $m$ registers are coupled in common to the $n$ frequency generators. Each of the $m$ registers include $n$ longtail transistor pairs each coupled to a different one of the $n$ generators. The longtail transistor pairs of an associated register each have their outputs coupled to a common transmission line. Bistable devices are coupled to each of the longtail transistor pairs of each register for activation of the longtail transistor pair to couple a given number of the $n$ generators to the associated common transmission.

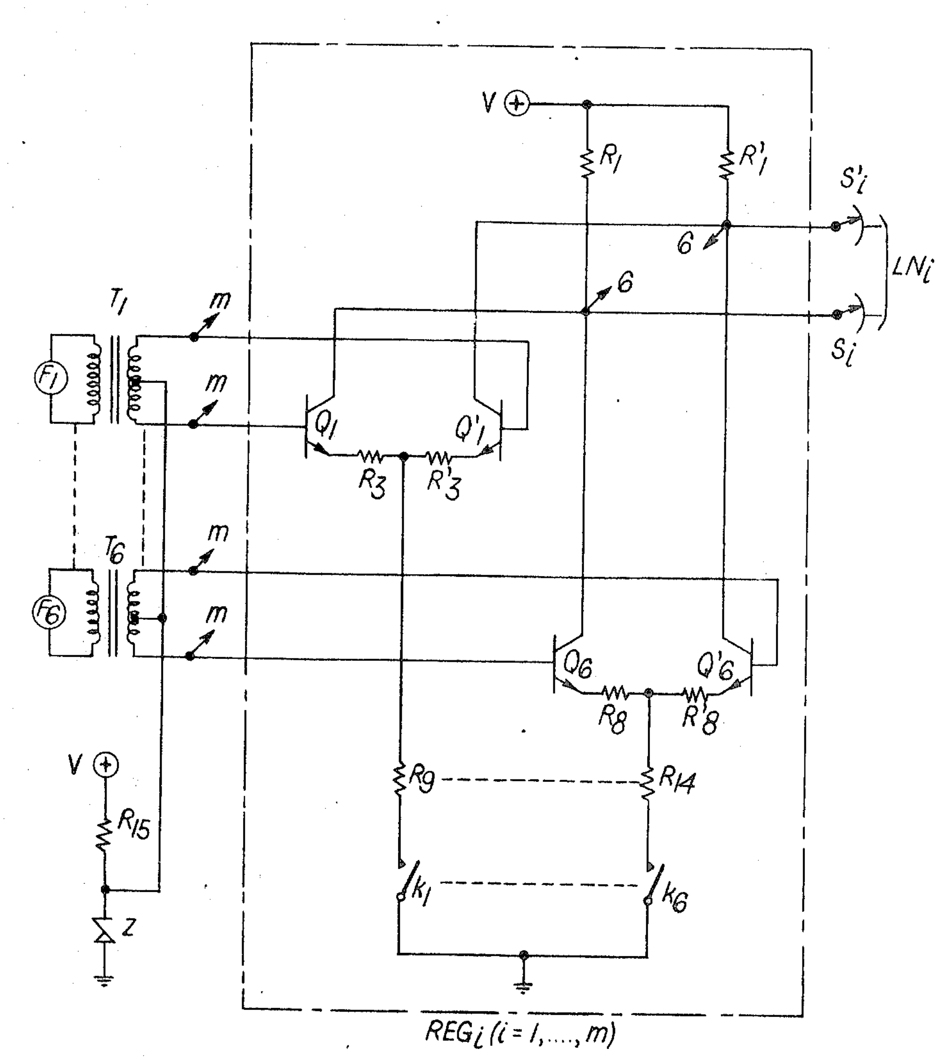
Inventor
G. Thyssens
By
[signature] Attorney

AC SIGNAL TRANSMISSION SYSTEM

The present invention relates to an AC signal transmission system.

Generally, in AC signal transmission systems an AC signal source feeding a plurality of transmission lines simultaneously, must be capable of delivering output signals at a sufficiently high power level. This power level depends on the number of transmission lines coupled thereto as well as on the amplitudes the AC signals must have at the transmitting ends of the lines. If the number of lines effectively coupled to the above source is variable and, if additionally, the amplitudes of the transmitted AC signals must be maintained substantially constant, a regulated amplifier has to be associated with each transmission line, in order to amplify and attenuate the low and high amplitude AC signals with regard to the above desired constant amplitude, respectively.

In a multifrequency signal transmission system, it would be desirable to use a set of $n$ self-running oscillators, each tuned to a different frequency coupled in common with all the circuits, e.g. telephone registers, requiring the transmission of such signals. This set of $n$ oscillators is coupled to the above plurality of transmission lines via a corresponding plurality of registers when these control the establishment of connections. Each register includes controlable selection switches to couple combinations of $p$ out of the $n$ oscillators ($p < n$) to its associated line, thus, enabling the transmission of multifrequency signal impulses, or bursts, according to a $p$ out of $n$ frequency-code system. In the above multifrequency signal transmission system, the $n$ circuits of a register which could selectively enable the coupling of the $n$ respective common oscillators to the input of the aforementioned regulated amplifier would have to be sufficiently decoupled, with respect to one another, e.g. by means of decoupling resistors. The resistance of the resistors would have to be sufficiently high with regard to the resistance of the signal sources in order to avoid applying unwanted frequencies to the registers. These resistors cause the input signals to the regulated amplifier to be at a lower level than the level of the signal of the common source. Since a variable number of registers may at one moment require a particular frequency to be applied to the lines with which they are associated, these resistors will constitute a variable shunt impedance for each signalling path causing the signal level at the input of the amplifier to vary for each frequency. The amplitude variations for each frequency are mutually dependent and the amplitude of signals having different frequencies applied simultaneously to an amplifier will, thus, not necessarily be at the same level.

Accordingly, the main drawbacks of the above system are that they would necessitate relatively high power AC signal sources and regulated nonlinear amplifiers which introduce a frequency distortion in the transmitted AC signals, particularly undesirable in multifrequency signalling.

It is an object of the present invention to provide an AC signal transmission system which does not present the mentioned drawbacks.

The present AC signal transmission system is characterized by the fact, that it includes an AC voltage signal source coupled to a plurality of transmission lines via corresponding linear voltage-current transducing arrangements.

According to another characteristic of the invention, the above AC signal transmission system is further characterized by the fact, that said source comprises $n$ oscillators tuned to $n$ different predetermined frequencies, and that said transducing arrangement includes $n$ voltage-current transducing circuits each having their input connected to the output of a different one of said $n$ oscillators and their output coupled in common to an associated transmission line.

Still another characteristic of the above AC signal transmission system resides in the fact that said transducing arrangement further includes $n$ constant current generator means to feed a different one of $n$ transducing circuits via a different one of $n$ bistable switching means which in their rest condition electrically disconnect said constant current generator means from their associated transducing circuits, and that control means are associated with said arrangement to selectively activate said bistable means to transmit AC signal impulses of corresponding frequencies via the associated common transmission line.

The above mentioned and other objects and features of the invention will become more apparent and the invention itself will be best understood by referring to the following description of embodiments taken in conjunction with the accompanying FIG. which is a schematic diagram of a multifrequency AC signal transmission system in accordance with the invention.

Referring to the FIG., the multifrequency AC signal transmission system shown therein, constitutes the transmitting part of a signalling station, which is able to transmit code signals to $m$ receiving stations (not shown) via $m$ transmission lines LN$i$, where $i$=1,...,$m$. It is assumed that the above code signals are constituted by combinations of two frequencies out of six available ones $f1$ to $f6$, which are all in the voice frequency band. The transmitting part comprises six oscillators F1 to F6, respectively, tuned to the six frequencies $f1$ to $f6$ and generating AC signals of equal amplitudes. These oscillators F1 to F6 are connected to corresponding inputs of each one of $m$ registers REG1 to REG$m$ via their output transformers T1 to T6. The secondary windings of transformers T1 to T6 each having a center-tap connected in common to the junction of a resistor R15 and a Zener diode Z forming a potentiometer, the free end of resistor R15 and the anode of diode Z being connected to a source V of positive D$^{C}$ potential and to ground, respectively. Each register REG$i$ ($i$=$l$ to $m$) includes six longtail NPN pair of transistors Q1/Q'1 to Q6/Q'6 which have their bases correspondingly connected to the ends of the associated secondary winding of transformers T1 to T6. The emitters of each of the pair of transistors Q1/Q'1 to Q6/Q'6 are interconnected via the series connection of a pair of resistors R3/R'3 to R8/R'8, the junction of each pair of resistors being connected to ground via the series connection of a resistor R9 to R14 and a make contact $k1$ to $k6$, respectively. Resistors R3 to R8 and R'3 to R'8 are all equal in value. Resistors R9 to R14, which simulate constant current sources, are also equal in value. The collectors of transistors Q1 to Q6 (Q'1 to Q'6) of register REG$i$ are connected to a common point. Each of these common points are connected, on the one hand, to the source V of positive DC potential via a resistor R1 (R'1) and, on the other hand, to the associated conductor of a two-wire transmission line LN$i$ via a selector contact S$i$ (S'$i$). The contacts $k1$ to $k6$ are controlled by associated relays (not shown) of register REG$i$.

The principle of operation of the above multifrequency signal transmission system is as follows:

The output signals of oscillators F1 to F6 are applied in push-pull to the bases of nonsaturating pair of transistors Q1/Q'1 to Q6/Q'6 of each register REG$i$ ($i$=1 to $m$) via the transformers T1 to T6, respectively, the amplitude of the above output signals being smaller than the DC bias level applied to their bases by Zener diode Z via the secondary windings of transformers T1 to T6. In the rest condition, the relays of register REG$i$ which control the contacts $k1$ to $k6$ thereof are not energized, so that contacts $k1$ to $k6$ are open and the corresponding constant current feeding paths of the pair of transistors Q1/Q'1 to Q6/Q'6 are interrupted. Hence, no currents circulate from the collectors of the pair of transistors Q1/Q'1 to Q6/Q'6 to source V via resistors R1 and R'1 and no output AC signals are transmitted via line LN$i$. When a multifrequency code signal has to be transmitted, by register REG$i$, e.g. a code signal comprising the frequencies $f1$ and $f6$, a corresponding combination of two out of six relays (not shown) controlling the six contacts $k1$ to $k6$ thereof is activated for a time interval equal to the time duration of a code signal e.g. the two relays controlling the contacts $k1$ and $k6$. These contacts $k1$ and $k6$ close and as a consequence the constant current paths of the pair of transistors Q1/Q'1 and Q6/Q'6 are established. The balanced collector AC currents of the pair of transistors Q1/Q'1 and Q6/Q'6 of frequencies $f1$ and $f6$, respectively, are summed through resistances R1 and R'1, so that the resulting output code signal is constituted by the frequencies $f1$ and $f6$. This code signal is transmitted to a remote receiving station via the associated transmission line LN$i$. After the above time duration, contacts $k1$ and $k6$ break, their control relays being deenergized, so that the constant current supply paths to longtail pair of transistors Q1/Q'1 and Q6/Q'6 are again interrupted. The following multifrequency code signals are transmitted in a similar way. It is obvious that the control means of register REG$i$ are so arranged, that the successively selected combinations of two contacts out of the six remain closed for a same predetermined time interval, so that the transmitted multifrequency code signal bursts each have this one predetermined duration.

From the foregoing description, it becomes clear that oscillators F1 to F6 which are common to the $m$ registers REG1 to REG$m$ of the above described transmitting station do not have to supply output signals at a high power level, since they are coupled to the transmission lines LN1 to LN$m$ via the corresponding longtail pair of transistors Q1/Q'1 to Q6/Q'6 of registers REG1 to REG$m$, such a longtail pair of transistors constituting a voltage-current transducing circuit. Hence, the number $m$ of registers REG$i$ coupled to the low power oscillators F1 to F6 may be chosen to be high. Finally, due to the above constant current operating longtail pair of transistors, the use of a regulated amplifier, entailing the drawbacks previously mentioned, is avoided.

While the principles of the invention have been described above in connection with specific apparatus, it is to be clearly understood that this description is made only by way of example and not as a limitation on the scope of the invention.

I claim:

1. An AC signal transmission system comprising:
an output transmission line;
$n$ oscillator means each generating a different frequency signal;
$n$ longtail pair of transistors, each of said pair of transistors being coupled to a different one of said oscillator means; and control means coupled to each of said pair of transistors to control the selective activation of a predetermined number of said pair of transistors to couple said frequency signal of the activated predetermined number of said oscillator means to said transmission line for a given time interval.

2. A system according to claim 1, wherein said control means activates a plurality of said pair of transistors less than $n$ to provide a multifrequency code signal for coupling to said transmission line.

3. A system according to claim 1, wherein:
the amplitude of each of said frequency signals generated by said oscillator means are substantially equal; and
the attenuation of each of said pair of transistors are substantially equal to provide a substantially equal amplitude for said frequency signals coupled to said transmission line.

4. A system according to claim 1, wherein:
said control means includes $n$ bistable means, each of said bistable means being coupled to a different one of said pair of transistors.

5. A system according to claim 4, wherein a plurality of said $n$ bistable means less than $n$ are activated to activate a corresponding plurality of said pair of transistors to provide a multifrequency code signal for coupling to said transmission line.

6. A system according to claim 4, wherein said $n$ pair of transistors and said $n$ bistable means are included in a telephone register.

7. A system according to claim 6, further including:
a plurality of transmission lines similar to said output transmission line; and
a plurality of registers similar to said telephone registers, each of said plurality of registers being coupled to a different one of said plurality of transmission lines and in common to said $n$ oscillator means.